United States Patent
Kadaster et al.

(10) Patent No.: US 9,875,468 B2
(45) Date of Patent: Jan. 23, 2018

(54) INTELLIGENT AUTHENTICATION PROCESS

(71) Applicant: BUY IT MOBILITY NETWORKS INC., Atlanta, GA (US)

(72) Inventors: Aydin A. Kadaster, New York, NY (US); Adam Frisch, Sands Point, NY (US)

(73) Assignee: BUY IT MOBILITY NETWORKS INC., Atlanta, GA (US)

( * ) Notice: Subject to any disclaimer, the term of this patent is extended or adjusted under 35 U.S.C. 154(b) by 0 days.

(21) Appl. No.: 14/554,701

(22) Filed: Nov. 26, 2014

(65) Prior Publication Data

US 2016/0148201 A1 May 26, 2016

(51) Int. Cl.
*G06Q 20/02* (2012.01)
*G06Q 20/40* (2012.01)
*G06Q 20/42* (2012.01)

(52) U.S. Cl.
CPC ........... *G06Q 20/02* (2013.01); *G06Q 20/401* (2013.01); *G06Q 20/425* (2013.01); *G06Q 20/40* (2013.01); *G06Q 20/4012* (2013.01); *G06Q 20/4014* (2013.01)

(58) Field of Classification Search
CPC .... G06Q 20/02; G06Q 20/40; G06Q 20/4014; G06Q 20/4012; G06Q 20/401; G06Q 20/425
USPC .......................................................... 705/44
See application file for complete search history.

(56) References Cited

U.S. PATENT DOCUMENTS

| | | | |
|---|---|---|---|
| 6,728,397 B2 | 4/2004 | McNeal | |
| 6,754,640 B2 | 6/2004 | Bozeman | |
| 7,041,099 B2 | 5/2006 | Thomas et al. | |
| 7,177,846 B2 | 2/2007 | Moenickheim et al. | |
| 7,188,179 B1 * | 3/2007 | Hanson ............... | H04L 12/5692 709/227 |
| 7,430,537 B2 | 9/2008 | Templeton et al. | |
| 7,519,557 B1 | 4/2009 | Lee | |
| 7,574,405 B2 | 8/2009 | Rallo et al. | |

(Continued)

OTHER PUBLICATIONS

S1 and digital envoy cooperate on identity fraud prevention for financial institutions; companies form strategic relationship to deliver real-time fraud prevention capabilities . . . (May 16, 2005). Business Wire Retrieved on Sep. 7, 2017 (Year: 2005).*
Alain Hiltgen et al., Secure Internet Banking Authentication, IEEE Security & Privacy, The IEEE Computer Society, 2005, pp. 24-32.

*Primary Examiner* — Kito R Robinson
(74) *Attorney, Agent, or Firm* — Foley & Lardner LLP

(57) ABSTRACT

A method is provided for authentication that includes receiving consumer information associated with a consumer transmitted over a first data network, determining available account authentication options based on the received consumer information and a database of potential authentication options stored in a memory, selecting a set of available authentication options from the available authentication options based on a database of the potential authentication option attributes stored in the memory, transmitting the selected set of available authentication options to the consumer over the first data network, receiving a selected authentication option transmitted over the first data network, transmitting the consumer information to an authentication provider associated with the selected authentication option over a second data network, and receiving an authentication confirmation transmitted over the second data network.

31 Claims, 4 Drawing Sheets

(56) References Cited

U.S. PATENT DOCUMENTS

| | | | |
|---|---|---|---|
| 7,693,783 B2* | 4/2010 | Balasubramanian | G06Q 20/02 235/380 |
| 7,707,120 B2 | 4/2010 | Dominguez et al. | |
| 7,743,405 B2* | 6/2010 | Hancock | H04L 63/08 380/247 |
| 7,761,353 B1 | 7/2010 | Silverman | |
| 7,765,153 B2 | 7/2010 | Nethery, III | |
| 7,827,108 B2 | 11/2010 | Perlman et al. | |
| 7,827,115 B2* | 11/2010 | Weller | G06Q 20/02 705/44 |
| 8,016,185 B2* | 9/2011 | Modi | G06Q 20/02 235/379 |
| 8,027,921 B1* | 9/2011 | Boydstun | G06F 21/31 705/50 |
| 8,041,099 B2 | 10/2011 | Abed | |
| 8,041,640 B2 | 10/2011 | Stone | |
| 8,225,992 B2* | 7/2012 | Henry | G06Q 20/042 235/379 |
| 8,249,965 B2* | 8/2012 | Tumminaro | G06Q 20/12 705/35 |
| 8,352,362 B2 | 1/2013 | Mohsenzadeh | |
| 8,423,466 B2* | 4/2013 | Lanc | G06Q 20/32 705/35 |
| 8,438,063 B2* | 5/2013 | Albisu | G06Q 20/20 705/16 |
| 8,452,709 B2 | 5/2013 | Hibbard et al. | |
| 8,473,355 B2* | 6/2013 | Quigley | G06Q 20/206 705/26.1 |
| 8,473,394 B2 | 6/2013 | Marshall | |
| 8,489,067 B2 | 7/2013 | Rackley, III et al. | |
| 8,572,391 B2* | 10/2013 | Golan | G06F 21/40 705/72 |
| 8,572,707 B2* | 10/2013 | Tuchman | H04L 9/3226 713/168 |
| 8,700,458 B2 | 4/2014 | Deaton et al. | |
| 8,700,524 B2* | 4/2014 | Williams | H04W 4/24 705/318 |
| 9,060,057 B1* | 6/2015 | Danis | H04M 3/42059 |
| 9,122,866 B1* | 9/2015 | Kolman | G06F 21/46 |
| 9,160,726 B1* | 10/2015 | Kaufman | H04L 63/08 |
| 9,189,777 B1* | 11/2015 | Dickinson | G06F 21/31 |
| 9,679,332 B2* | 6/2017 | Kim | G06Q 30/0643 |
| 2003/0115142 A1* | 6/2003 | Brickell | G06F 21/31 705/51 |
| 2003/0158815 A1* | 8/2003 | Yoshida | G06F 21/31 705/50 |
| 2003/0200180 A1* | 10/2003 | Phelan, III | G06Q 20/04 705/65 |
| 2004/0002878 A1* | 1/2004 | Maria Hinton | G06Q 20/3821 705/76 |
| 2004/0030659 A1* | 2/2004 | Gueh | G06Q 20/3674 705/67 |
| 2004/0106433 A1* | 6/2004 | Ooki | H04M 15/49 455/561 |
| 2004/0128257 A1* | 7/2004 | Okamoto | G06Q 10/02 705/66 |
| 2004/0204952 A1* | 10/2004 | Rochet | G06Q 30/02 705/1.1 |
| 2004/0225887 A1* | 11/2004 | O'Neil | H04L 63/083 713/193 |
| 2005/0154914 A1* | 7/2005 | Eguchi | G06F 21/35 726/4 |
| 2005/0222952 A1 | 10/2005 | Garrett et al. | |
| 2006/0036537 A1 | 2/2006 | Lawrence et al. | |
| 2006/0053296 A1* | 3/2006 | Busboom | H04L 63/083 713/182 |
| 2006/0131390 A1* | 6/2006 | Kim | G06Q 20/24 235/380 |
| 2006/0165060 A1* | 7/2006 | Dua | G06Q 20/20 370/352 |
| 2006/0178986 A1* | 8/2006 | Giordano | G06Q 20/04 705/40 |
| 2006/0195398 A1 | 8/2006 | Dheer et al. | |
| 2007/0094150 A1* | 4/2007 | Yuen | G06Q 20/02 705/64 |
| 2007/0179885 A1* | 8/2007 | Bird | G06Q 20/04 705/39 |
| 2007/0199053 A1* | 8/2007 | Sandhu | G06F 21/31 726/4 |
| 2007/0219905 A1* | 9/2007 | Gohmann | G06Q 40/02 705/44 |
| 2007/0288377 A1* | 12/2007 | Shaked | G06Q 20/04 705/44 |
| 2008/0162295 A1 | 7/2008 | Bedier | |
| 2008/0162338 A1* | 7/2008 | Samuels | G06F 21/40 705/38 |
| 2008/0201578 A1* | 8/2008 | Drake | G06F 21/36 713/172 |
| 2008/0288299 A1* | 11/2008 | Schultz | G06Q 30/06 705/4 |
| 2009/0037285 A1* | 2/2009 | Murphy | G06Q 20/20 705/16 |
| 2009/0055904 A1* | 2/2009 | Gomi | H04L 63/08 726/4 |
| 2009/0133117 A1* | 5/2009 | Bentley | H04L 9/3271 726/17 |
| 2010/0030687 A1 | 2/2010 | Panthaki et al. | |
| 2010/0049619 A1* | 2/2010 | Beck | G06Q 20/102 705/26.1 |
| 2010/0082486 A1* | 4/2010 | Lee | G06Q 20/12 705/44 |
| 2010/0106649 A1* | 4/2010 | Annan | G06Q 20/32 705/67 |
| 2010/0146263 A1* | 6/2010 | Das | G06Q 20/385 713/155 |
| 2010/0223165 A1* | 9/2010 | Calman | G06Q 40/02 705/30 |
| 2011/0004921 A1* | 1/2011 | Homer | G06F 21/31 726/3 |
| 2011/0016051 A1* | 1/2011 | Trifiletti | G06Q 20/20 705/44 |
| 2011/0047606 A1* | 2/2011 | Blomquist | G06F 21/41 726/7 |
| 2011/0184840 A1 | 7/2011 | Godard et al. | |
| 2011/0225057 A1* | 9/2011 | Webb | G06Q 20/20 705/16 |
| 2011/0307381 A1* | 12/2011 | Kim | G06Q 20/027 705/44 |
| 2012/0078765 A1 | 3/2012 | Gopynadhan | |
| 2012/0144034 A1* | 6/2012 | McCarty | H04L 63/0823 709/225 |
| 2012/0179558 A1* | 7/2012 | Fischer | G06Q 20/20 705/16 |
| 2012/0197801 A1* | 8/2012 | Jimenez | G06Q 20/206 705/44 |
| 2012/0267432 A1 | 10/2012 | Kuttuva | |
| 2012/0284175 A1 | 11/2012 | Wilson et al. | |
| 2012/0310828 A1 | 12/2012 | Hu | |
| 2013/0159185 A1* | 6/2013 | Lee | G06Q 40/02 705/44 |
| 2013/0246203 A1* | 9/2013 | Laracey | G06Q 30/0253 705/21 |
| 2013/0262309 A1* | 10/2013 | Gadotti | G06Q 20/3276 705/44 |
| 2013/0322262 A1* | 12/2013 | Akman | H04W 24/10 370/242 |
| 2013/0346302 A1 | 12/2013 | Purves et al. | |
| 2015/0046340 A1* | 2/2015 | Dimmick | G06Q 20/40 705/72 |
| 2015/0334718 A1* | 11/2015 | Sato | H04W 8/18 370/329 |
| 2015/0349962 A1* | 12/2015 | Rice | G06F 21/64 713/176 |
| 2016/0125199 A1* | 5/2016 | Lee | G06F 21/316 726/28 |

* cited by examiner

INTELLIGENT AUTHENTICATION PROCESS

BACKGROUND

Electronic authentication processes provide a convenient way to confirm information, such as an identity or that an individual has access to a bank account. However, pre-existing electronic authentication processes do not provide coverage for all users or scenarios. For example, an electronic authentication process for confirming that an individual has access to a bank account based on the individual's online banking information may only be successfully utilized by those individuals that utilize online banking and that are willing to provide the necessary online banking information.

SUMMARY

Multiple electronic authentication processes may be combined to effectively increase the portion of the population that may utilize electronic authentication processes. In some cases, providing a large number of authentication options may confuse a user or undesirably increase the cost of the electronic authentication process. In light of the above, the present inventors have provided an intelligent authentication process.

Provided in one embodiment is a method for authentication including receiving consumer information associated with a consumer transmitted over a first data network, determining available account authentication options based on the received consumer information and a database of potential authentication options stored in a memory, selecting a set of available authentication options from the available authentication options based on a database of the potential authentication option attributes stored in the memory, transmitting the selected set of available authentication options to the consumer over the first data network, receiving a selected authentication option transmitted over the first data network, transmitting the consumer information to an authentication provider associated with the selected authentication option over a second data network, and receiving an authentication confirmation transmitted over the second data network.

The database of attributes for the potential authentication options may include information related to at least one of the successful completion rate, an average authentication time, a consumer selection rate, a cost, and a preferred status. Selecting the set of the available authentication options may additionally include evaluating the real-time availability of an authentication provider associated with each authentication option. The method may additionally include transmitting additional information requests to the consumer over the first data network along with the selected set of available authentication options. The database of potential authentication options may include at least one of online instant account verification, debit card and PIN based authentication, status as part of a pre-authenticated account database, mobile account-based verification, and challenge-deposit-withdrawal verification. The selected set of the available authentication options may be a subset of the available authentication options. The first data network may be a wireless data network. The method may additionally include selecting the authentication provider associated with the selected authentication option from a database stored in the memory of potential authentication providers capable of providing the selected authentication option. The authentication provider may be selected based on at least one of cost, preferred status, historical average authentication speed, instantaneous availability, and instantaneous connection speed.

The method may additionally include comparing the consumer information against a database of pre authenticated consumers. The consumer information may include at least one of personally identifying information, bank account information, consumer preference, consumer demographic information, credit card information, debit card information, loyalty card or program information, and a subscriber identity stored on a subscriber identity module of a mobile device. The transmission of the selected set of available authentication options to the consumer over the first data network may comprise transmitting the selected set of available authentication options to a mobile internet device associated with the consumer. The consumer information may be received from a vendor offering a cardless payment option to the consumer. The selected set of authentication options may include authentication options utilizing different authentication pathways, such that the consumer is provided with at least two different authentication pathways. The selected set of authentication options may include only instantaneous authentication options.

The method may additionally include transmitting an authentication confirmation to the consumer over the first data network. The authentication may be of a payment account. The method may additionally include updating the status of an account associated with a consumer to reflect the authentication of the payment account.

The method may additionally include receiving an authentication failure transmitted over the second data network, selecting a second set of available authentication options from the available authentication options based on a database of potential authentication option attributes stored in the memory and not including the authentication option that produced the authentication failure, transmitting the second selected set of available authentication options to the consumer over the first data network, receiving a second selected authentication option transmitted over the first data network, and transmitting the consumer information to an authentication provider associated with the second selected authentication option over the second data network.

In another embodiment, a method for authentication is provided including receiving consumer information associated with a consumer transmitted over a first data network, determining available account authentication options based on the received consumer information and a database of potential authentication options stored in a memory, selecting a set of available authentication options from the available authentication options based on a database of attributes for the potential authentication options stored in the memory, transmitting the selected set of available authentication options to the consumer over the first data network, receiving a selected authentication option transmitted over the first data network, transmitting the consumer information to an authentication provider associated with the selected authentication option over a second data network, receiving an authentication confirmation transmitted over the second data network, and updating the database of attributes for the potential authentication options in the memory to include the authentication confirmation.

The updating the database of attributes for the potential authentication options may include updating data for the authentication option selected to reflect at least one of the time of authentication, speed of authentication, cost of the authentication, consumer demographic information, device type, consumer location, and success rate. The method may additionally include receiving an authentication failure transmitted over the second data network, and transmitting the consumer information to a second authentication provider associated with the selected authentication option over the second data network.

In another embodiment, a method for authentication is provided that includes receiving consumer information associated with a consumer transmitted over a first data network, determining available account authentication options based on the received consumer information and a database of potential authentication options stored in a memory, selecting an authentication option from the available authentication options based on a database of the potential authentication option attributes stored in the memory, transmitting consumer information to an authentication provider associated with the selected authentication option over a second data network, and receiving an authentication confirmation transmitted over the second data network. The method may further include transmitting a request for additional consumer information associated with the selected authentication option to the consumer over the first data network, and receiving additional consumer information transmitted over the first data network. The consumer information transmitted to the authentication provider may include the additional consumer information.

BRIEF DESCRIPTION OF THE DRAWINGS

The skilled artisan will understand that the drawings primarily are for illustrative purposes and are not intended to limit the scope of the inventive subject matter described herein. In the drawings, like reference characters generally refer to like features (e.g., functionally similar and/or structurally similar elements).

DETAILED DESCRIPTION

Figure 1:
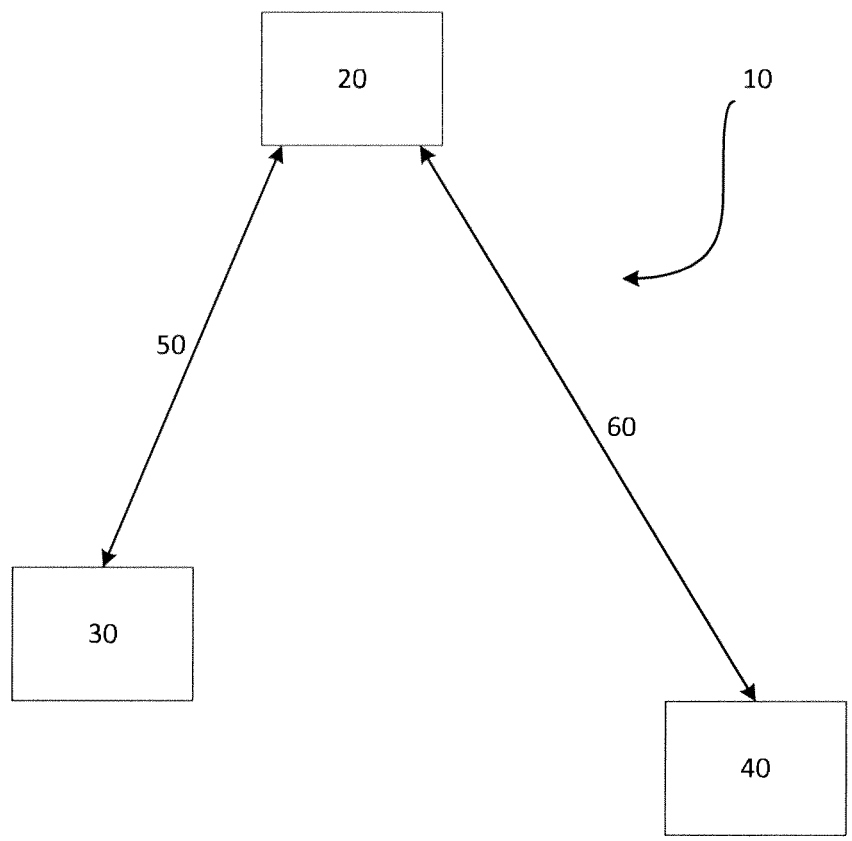
FIG. 1 is a schematic depiction of a system for carrying out an authentication process, according to one embodiment.

Following below are more detailed descriptions of various concepts related to, and embodiments of, intelligent authentication processes. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

The intelligent authentication process described herein provides access to an electronic authentication process to a large percentage of the population, while also providing a simplified user experience. The intelligent authentication process also provides an increased likelihood that the authentication options provided to the consumer will result in the successful completion of an authentication transaction. The authentication process is considered 'intelligent' because a database of attributes of the various authentication options is employed to select a set of authentication options from the pool of potential authentication options. The weighting of the specific attributes employed to make the selection may vary depending on the type of information to be authenticated, or the goals of the authentication process.

The authentication process may be employed to authenticate any appropriate information. For example, the authentication process may be employed to authenticate an individual's identity, personally identifiable information, or a bank account. With regard to a bank account, authentication indicates that an individual has access to the bank account and may authenticate payments from the account. One application of the authentication process may be to authenticate a bank account for use as a payment account, such as in an electronic payment system. According to one embodiment, the authentication process is employed to authenticate a hank account for use in an electronic payment system that utilizes automated clearing house (ACH) funds transfers. Additionally, the authentication process may be employed to authenticate other types of payment accounts, such as credit accounts, debit accounts, or prepaid accounts. For the sake of convenience, the authentication process is described as applicable to authentication of a bank account, but it should be understood that the authentication process may be employed to authenticate other types of information as well.

The authentication process may be initiated by a consumer wishing to authenticate a bank account as a payment account for an electronic payment system. The initiation of the authentication process may include supplying consumer information associated with the consumer to a processor. The processor may then deter mine the available authentication options based on the provided consumer information, and select from the available authentication options a set of authentication options to provide to the consumer. The consumer information may then be provided by the processor to an authentication provider for the consumer selected authentication option. The processor may be any entity seeking to conduct an authentication process. According to one embodiment, the processor may be an account issuer, such as an account issuer for an electronic payment system.

An exemplary system for carrying out the process and the interactions between the consumer, the processor, and the authentication provider is illustrated in FIG. 1. The electronic authentication system 10 includes a consumer device 30, a processor 20, and an authentication provider 40. The consumer device 30 and the processor 20 are connected by a first data network 50, and the processor 20 and the authentication provider 40 are connected by a second data network.

The consumer device 30 may be any appropriate device, such as a computer or mobile internet device. According to one embodiment, the mobile internet device is capable of connecting to the Internet over a wireless data network, and may be a smartphone or tablet. The consumer device may access the processor through a website portal or through a dedicated software application. In the case that a dedicated software application is employed, the software application may be associated with a particular merchant or with an electronic payment system that may be utilized with multiple merchants.

The processor 20 may be a computer specially configured and programmed to carry out the authentication process. For example, the processor may include a memory that stores a database of potential authentication options, and attributes associated with the potential authentication options. According to one embodiment, the computer may be a server. The processor may also be configured to utilize the database of potential application options in conjunction with consumer information to determine the available authentication options, and select a set of authentication options to provide to the consumer based on the attributes of the potential application options.

The authentication provider 40 may be a third party. The authentication provider may be a plurality of third parties, with different third parties associated with different potential authentication options. According to one embodiment, a single authentication provider may be associated with a plurality of different potential authentication options. Additionally, the processor may in some cases also be an authentication provider associated with at least one of the different potential authentication options.

The first data network 50 and the second data network 60 may be the same or different types of data networks. The data networks may be wired or wireless data networks. A wireless data network may be any suitable wireless network capable of communicating data. According to one embodiment, the wireless data network may be a Wi-Fi network or a cellular data network. In one embodiment, the wireless network may be a secure network. According to one embodiment the first data network 50 is a wireless data network, and the second data network 60 is a wired data network. According to one embodiment, the first data network and/or second data network may include intermediary entities that serve to facilitate communication between the consumer device and the processor or the processor and the authentication provider, respectively. For example, the first data network may include a merchant cloud, such that the consumer device is connected to the merchant cloud and the merchant cloud is connected to the processor, such that the merchant cloud facilitates communication between the consumer device and the processor.

Figure 2:
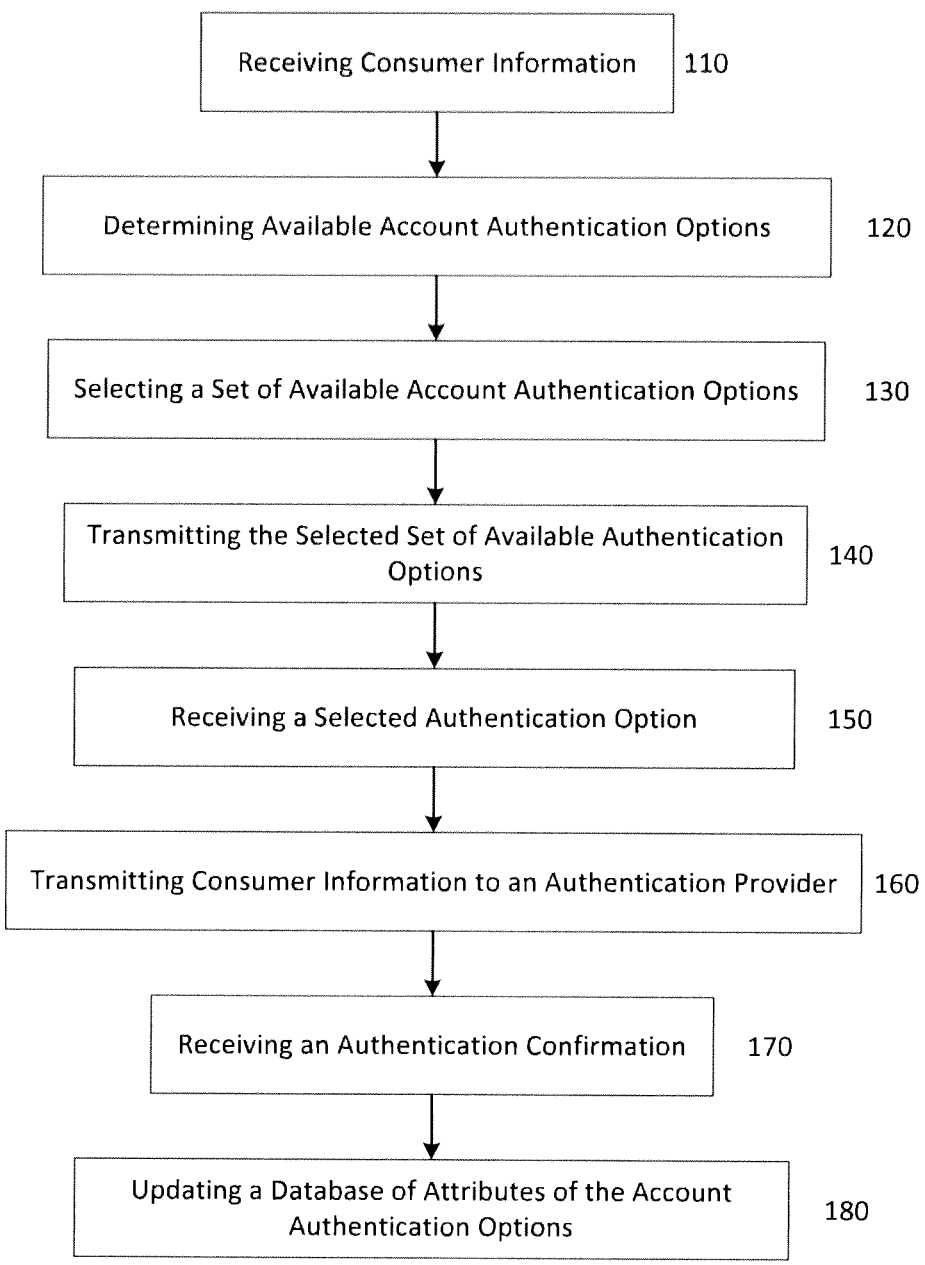
FIG. 2 depicts a flow chart illustrating an authentication process, according to one embodiment.

FIG. 2 depicts a flow chart for an authentication process carried out by the processor according to one embodiment. The authentication process may include receiving consumer information 110, where the consumer information is associated with a consumer and transmitted over the first data network. The available account authentication options may then be determined 120 based on the received consumer information and a database of potential authentication options stored in a memory of the processor. A set of available authentication options is then selected from the available authentication options 130 based on a database of potential authentication option attributes stored in a memory of the processor. The processor then transmits the selected set of authentication options to the consumer 140 over the first data network, and receives a selected authentication option 150 transmitted from the consumer over the first data network. Consumer information is then transmitted to an authentication provider 160 associated with the selected authentication option over the second data network, and an authentication confirmation is received 170 from the authentication provider. The consumer information may include the first consumer information transmitted over the first data network, or may include additional consumer information transmitted over the first data network. According to one embodiment, the consumer information may be different than the first consumer information transmitted over the first data network. The authentication process may include an optional step of updating the database of potential authentication option attributes to reflect the authentication confirmation.

The consumer information may be actively or passively supplied by the consumer. Actively supplied consumer information may include personally identifying information, bank account information, consumer preferences, consumer demographic information, credit card information, debit card information, and loyalty card or program information. Examples of personally identifying information include a consumer's name, address, driver's license number, passport number, military identification number, social security number and other government issued identification. According to one embodiment, the consumer may actively enter bank account information or personally identifiable information to the consumer device and transmit that information to the processor.

According to an alternative embodiment, consumer information may be provided to the processor passively by the consumer. In the case that the consumer device is a mobile internet device that includes a subscriber identity module, commonly referred to as a SIM card, a subscriber identity stored on the SIM card may be transmitted to the processor. Additionally, information regarding the type of consumer device employed or the consumer's geographic location may be provided to the processor without the consumer actively entering the information into the consumer device. In some cases, the consumer information may be provided to the processor by a vendor offering a cardless payment option to the consumer, as opposed to by the consumer directly.

The database of potential authentication options may include any suitable authentication options. Generally, providing additional potential authentication options will allow a larger percentage of consumers to utilize the authentication process. The potential authentication options may include both instantaneous authentication options and non-instantaneous authentication options. As utilized herein, an instantaneous authentication option may provide an authentication determination in less than five minutes, such as less than about 60 seconds.

Exemplary instantaneous authentication options include online account verification, debit card and personal identification number (PIN) verification, verification of status as part of a pre-approved account database, account information verification, and mobile account-based verification. Online account verification refers to a process in which the consumer provides an online banking username and password associated with the bank account to be authenticated, allowing an authentication provider to utilize this information to confirm that the consumer has access to the bank account, that the bank account is valid, additional bank account information such as an account number or routing number, or other information regarding the bank account. Debit card and PIN verification includes the consumer supplying a debit card number and a PIN associated with the bank account to be authenticated, allowing an authentication provider to utilize this information to confirm that the consumer has access to the hank account, that the bank account is valid, additional hank account information such as an account number or routing number, or other information regarding the bank account. If a consumer is part of a database of pre-approved consumers and accounts, the bank account was previously authenticated for the consumer and that information may be relied on to determine that the consumer has access to the bank account, that the bank account is valid, additional bank account information such as an account number or routing number, or other information regarding the bank account. Account information verification refers to a process in which the consumer provides an account number, a routing number and at least one additional unique identifier associated with the account, such as a driver's license number, social security number, mother's maiden name, address, or other appropriate identifier associated with the account to be authorized allowing an authentication provider to utilize this information to confirm that the consumer has access to the bank account, that the bank account is valid, or other information regarding the bank account. Mobile based-account verification refers to a process in which the consumer utilizes a mobile internet device, such as a smart phone, to carry out the authentication process. The subscriber identity stored on the SIM card and provided to the processor identifies a mobile account associated with the consumer, and an authentication provider may determine whether the bank account to be authenticated has previously been utilized to make payments to the mobile account, indicating that the consumer has access to the bank account, that the bank account is valid, additional bank account information such as an account number or routing number, or other information regarding the bank account. Another instantaneous authentication option may involve the authentication provider requesting information from the consumer that only an individual with access to the account to be verified would have, such as identifiers associated with the consumer that the bank then confirms as correct, verifying the account.

The non-instantaneous account authentication options may allow consumers that are not capable of utilizing an instantaneous authentication option or that do not wish to provide the information necessary for an instantaneous authentication option to utilize the authentication process. An exemplary non-instantaneous authentication option is a challenge-deposit-withdrawal (CDW) process. A CDW process includes the deposit or withdrawal of a small sum or sums to the bank account to be authenticated, and the consumer then provides the amount of the deposit or withdrawal to the authentication provider to demonstrate that they have access to the account. The bank account to be authenticated may be identified by the consumer by supplying the routing number and account number associated with the bank account. Alternatively, an image of a check may be provided by the consumer that includes the routing number and account number associated with the bank account. Due to the time necessary to complete a deposit or withdrawal, a CDW authentication may take a number of days.

An instantaneous authentication process is generally preferred over a non-instantaneous authentication process. An instantaneous authentication process allows the consumer to utilize the authenticated account immediately. If the authentication process is employed to authenticate a payment account for a cardless payment system, a consumer may be more likely to utilize the cardless payment system when an account may be created and immediately utilized to make payments. By contrast, an extended time between attempting to authenticate an account and receiving an authentication confirmation may prevent a consumer from utilizing the authenticated account for the desired purpose. For example, if a consumer attempts to sign up for a merchant's cardless payment system while waiting in a check-out line, an instantaneous authentication would allow the consumer to utilize the cardless payment system to make purchases immediately, while a non-instantaneous authentication would not.

The determination of the available account authentication options may be based on the received consumer information and a database of potential authentication options stored in a memory of the processor. The consumer information may indicate which of the available account authentication options are available for use by the consumer. For example, if the consumer information includes a bank of an account to be authenticated and the database of potential authentication options indicates that the bank provides an online banking service, online account verification is considered an available authentication option. Additionally, determining available account authentication options may include the elimination of account authentication options that are not compatible with the consumer information received.

Once the available account authentication options are determined, a set of available authentication options may be selected therefrom for transmission to the consumer. The set of selected available authentication options is determined based on a database of potential authentication option attributes stored in a memory of the processor. The attributes stored in the database may include dynamic and static attributes associated with each potential authentication option. Static attributes are those that do not change with each authentication transaction. The static attributes stored in the database may include a cost and a preferred status of the authentication option. Dynamic attributes are those that are based on a running average property updated for each authentication transaction or those that are measured at the time of selecting the set of available authentication options. The dynamic attributes stored in the database associated with each authentication option may include a successful completion rate, an average authentication time, a consumer selection rate, and a real-time availability of an authentication provider.

Additionally, the database of attributes of the potential authentication options may include information on the profiles of the consumers that have selected each authentication option, and the likelihood of success associated with each authentication option for a given consumer profile. Consumer profile information may include information including the consumer's demographic information, such as the consumer's age and sex, consumer's geographic location, historical purchasing and spending habits, and consumer device type. Generally, as more information is collected regarding the consumers that select a given authentication option and the success thereof is stored in the database, the accuracy and 'intelligence' of the authentication process increases such that the set of authentication options selected more accurately reflects the authentication options selected by similar consumers that are most likely to result in successful authentication.

The set of selected authentication options may include any appropriate number of authentication options, up to and including the entirety of the authentication options determined to be available. According to one embodiment, the set of selected authentication options is a subset of the available authentication options, such that the number of authentication options in the subset is less than the number of the authentication options deter mined to be available. The selection of a subset of available authentication options may allow the benefit of a large number of authentication options in covering a large percentage of consumers while presenting a limited number of authentication options to the individual consumer, such that the consumer's experience is simplified. The authentication options included in the subset may be determined based on a weighting of the various attributes included in the database. For example, an average authentication success rate may be considered the most important factor while cost is treated as a secondary factor, an appropriate weighting of these attributes would allow the selection of a set of authentication options that provide an optimal chance of authentication success at a minimal cost.

According to one embodiment, the subset may include only a single selected authentication option. In the case where the subset includes only a single authentication option, the single selected authentication option may not be provided to the consumer. For example, a single selected authentication option may be selected, and then consumer information may be transmitted to the authentication provider. The steps of transmitting the selected set of available authentication options over the first data network and receiving a selected authentication option transmitted over the first data network may be omitted when the subset includes only a single selected authentication option.

The set of available authentication options may be selected to include only instantaneous authentication options. Additionally, the set of available authentication options may be selected so that at least two different authentication pathways are included. An authentication pathway refers to the mechanism by which the authentication is carried out. According to one embodiment, the database of potential authentication options may include multiple authentication options that utilize the same authentication pathway, but a different authentication provider. For example, two available authentication options may be provided that both utilize the same authentication pathway, such as online instant account verification, but different authentication providers. Including multiple authentication pathways in the set of selected available authentication options allows a consumer a choice of the type of authentication pathway to utilize, and prevents the consumer from being presented with multiple authentication options which all utilize the same authentication pathway.

The selected set of available authentication options may then be transmitted to the consumer. This allows the consumer to select a desired authentication option, and transmit the selected authentication option back to the processor. The transmittal of the selected set of available authentication options to the consumer may be accompanied by additional information requests. The additional information requests may be specific to the authentication options included in the selected set. For example, an online instant account verification option may require the consumer's online banking username and password and this additional information may be requested at the time the selected set of available authentication options is transmitted to the consumer. Additionally, the types of additional information necessary for each available authentication option may influence the consumer's selection. For example, some consumers may be uncomfortable with providing an online banking username and password, and thus not select an instant online account verification option. According to one embodiment, the consumer information may be requested and provided in a two step process. For example, a request for information regarding the bank of an account to be authenticated may be transmitted to the consumer, and after receiving the bank information an additional request may be transmitted to the consumer for an online banking username and password associated with the account to be authenticated.

The selected authentication option transmitted by the consumer is then received by the processor. Optionally, additional consumer information may be transmitted by the consumer to the processor, such as along with the selected authentication option. The processor may then transmit consumer information to an authentication provider associated with the selected authentication option over the second data network. According to one embodiment, the consumer information transmitted to the authentication provider may include the additional consumer information transmitted by the consumer to the processor.

A plurality of authentication providers may be associated with the selected authentication option. An authentication provider may be selected based on a database of authentication providers associated with and capable of providing the selected authentication option stored in a memory of the processor. The database of authentication providers may include a number of attributes associated with the authentication providers. Similarly to the database of attributes of the authentication options, the database of authentication providers may include both static and dynamic attributes. According to one embodiment, the database of attributes of authentication providers may include at least one of cost, preferred status, historical average authentication speed, instantaneous availability, and instantaneous connection speed. The attributes may be weighted as appropriate to achieve an acceptable result. For example, cost may be considered a primary factor in selecting an authentication provider, with historical average authentication speed considered a secondary factor, such that low cost high-speed authentication providers are preferred.

The authentication provider then proceeds to authenticate the account, and transmits an authentication confirmation or failure to the processor over the second data network. If an authentication confirmation is received by the processor, an authentication confirmation may be transmitted to the consumer over the first data network. Additionally, if the account authentication was associated with the addition of the account as a payment account for an electronic payment system, the payment account associated with the consumer may be updated to indicate that the account is authenticated. The payment account associated with the consumer may optionally be updated to reflect additional information about the authenticated account, such as an account number or routing number, balance of the bank account, or other information regarding the bank account, or information about the consumer, such as personally identifiable information, consumer demographic information, or other information associated with the consumer. According to one embodiment, additional information regarding the authenticated account may be transmitted to the processor along with an authentication confirmation. The additional information regarding the authenticated account may include an account number or routing number, balance of the bank account, or other information regarding the bank account, or information about the consumer, such as personally identifiable information, consumer demographic information, or other information associated with the consumer.

Optionally, the dynamic attributes associated with the successful authentication option and the authentication provider in the databases stored in the memory of the processor may be updated to reflect the successful authentication transaction. The attributes updated in the database of available authentication options may include updating data for at least one of the time of authentication, speed of authentication, cost of the authentication, consumer demographic information, consumer device type, consumer location, and authentication success rate. By updating the attribute data, the dynamic attributes in the database will accurately reflect the desired information as of the most recent authentication transaction.

The processor may receive an authentication failure transmitted over the second data network from the authentication provider. The processor may then proceed to select a second set of authentication options or select a second authentication provider associated with the selected authentication option. Additionally, the processor may optionally transmit a notice of the authentication failure to the consumer's device over the first data network. The processor may optionally update the databases of the authentication option attributes and the authentication provider attributes to reflect the authentication failure.

Figure 3:
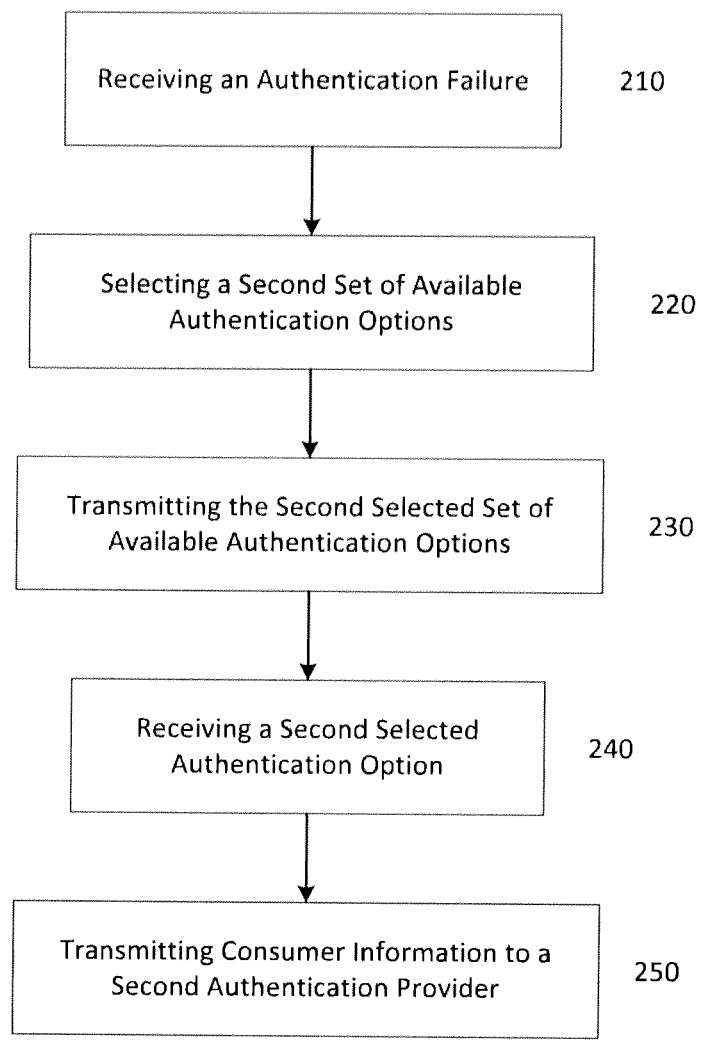
FIG. 3 depicts a flow chart illustrating an optional subprocess of an authentication process relating to an authentication failure, according to one embodiment.

As illustrated in FIG. 3, the processor may select a second set of authentication options in response to receiving an authentication failure 210. The second set of authentication options is selected from the available authentication options 220 based on the database of potential authentication options stored in the memory of the processor. The second set of authentication options does not include the authentication option that produced the authentication failure. Otherwise, the process for the selection of the second set of authentication options is the same as the process for selecting the first set of authentication options. The second set of authentication options is then transmitted to the consumer device 230 over the first data network, and the consumer selects a second authentication option. Once the second selected option is received over the first data network by the processor 240, the processor transmits the consumer information to an authentication provider associated with the second selected authentication option 250 over the second data network. The authentication provider may be selected as described above with regard to the process that does not include an authentication failure.

Figure 4:
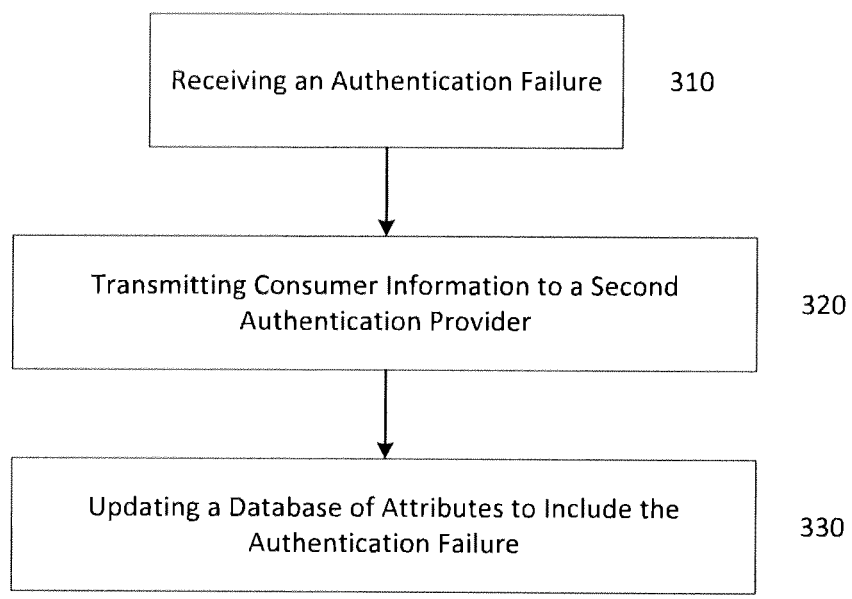
FIG. 4 depicts a flow chart illustrating an optional subprocess of an authentication process including updating a database of attributes relating to an authentication failure, according to one embodiment.

Alternatively, the processor may select a second authentication provider as illustrated in FIG. 4. After receiving an authentication failure 310 transmitted over the second data network, the processor may transmit the consumer information to a second authentication provider associated with the selected authentication option 320 over the second data network. The consumer information may optionally be transmitted to the second authentication provider without notifying the consumer of the authentication failure. By conducting the selection of a second authentication provider and transmission of the consumer information to the authentication provider without notifying the consumer, the consumer experience may be improved and/or streamlined. For example, not notifying the consumer of the authentication failure may increase the speed of the authentication process and prevent or reduce consumer complaints regarding authentication failures. The processor may optionally update the database of attributes for the potential authentication options 330 to include the authentication failure. The processor may also optionally update the database of attributes for the authentication provider to include the authentication failure.

According to an alternative embodiment, the authentication process may include the comparison of the consumer information against a pre-authenticated account database to determine if the account to be authenticated has been previously authenticated. If the account has been previously authenticated, the processor may determine that the account is authenticated without proceeding through any additional authentication procedures.

It should be appreciated that all combinations of the foregoing concepts (provided such concepts are not mutually inconsistent) are contemplated as being part of the inventive subject matter disclosed herein. All combinations of claimed subject matter appearing at the end of this disclosure are contemplated as being part of the inventive subject matter disclosed herein.

The indefinite articles "a" and "an," as used herein in the specification and in the claims, unless clearly indicated to the contrary, should be understood to mean "at least one."

It should be understood that various changes in form and detail may be made by one of ordinary skill in the art without departing from the spirit and scope of the appended claims.

What is claimed:

1. A method for authentication comprising:
receiving consumer information associated with a consumer transmitted over a first data network in a processor operated by an account issuer;
determining available account authentication options based on the received consumer information and a database of potential authentication options stored in a memory in the processor;
selecting a set of available authentication options from the available account authentication options based on a database of attributes for the potential authentication options stored in the memory in the processor;
transmitting the selected set of available authentication options to the consumer over the first data network from the processor;
receiving a selected authentication option transmitted over the first data network in the processor;
selecting an authentication provider associated with the selected authentication option from a database stored in the memory of potential authentication providers capable of providing the selected authentication option in the processor, wherein the authentication provider is selected based on at least one of historical average authentication speed or instantaneous connection speed;
transmitting consumer information to the authentication provider associated with the selected authentication option over a second data network, wherein the authentication provider is a third party that is a distinct entity from the consumer and the account issuer; and
receiving an authentication confirmation transmitted over the second data network in the processor.

2. The method of claim 1, wherein selecting the set of the available authentication options further comprises evaluating the real-time availability of an authentication provider associated with each authentication option.

3. The method of claim 1, further comprising transmitting additional information requests to the consumer over the first data network along with the selected set of available authentication options.

4. The method of claim 1, wherein the database of potential authentication options includes at least one of online instant account verification, debit card and PIN based authentication, status as part of a pre-authenticated account database, account information verification, mobile account-based verification, or challenge-deposit-withdrawal verification.

5. The method of claim 1, wherein the selected set of the available authentication options transmitted to the consumer is a subset of the available account authentication options.

6. The method of claim 1, wherein the first data network is a wireless data network.

7. The method of claim 1, further comprising comparing the consumer information against a database of pre authenticated consumers in the processor.

8. The method of claim 1, wherein the consumer information includes at least one of personally identifying information, bank account information, consumer preference, consumer demographic information, credit card information, debit card information, loyalty card or program information, or a subscriber identity stored on a subscriber identity module of a mobile device.

9. The method of claim 1, wherein transmitting the selected set of available authentication options to the consumer over the first data network comprises transmitting the selected set of available authentication options to a mobile internet device associated with the consumer.

10. The method of claim 1, wherein the consumer information is received from a vendor offering a cardless payment option to the consumer.

11. The method of claim 1, wherein the selected set of available authentication options includes authentication options utilizing different authentication pathways, such that the consumer is provided with at least two different authentication pathways.

12. The method of claim 1, wherein the selected set of available authentication options consists of instantaneous authentication options.

13. The method of claim 1, further comprising transmitting an authentication confirmation to the consumer over the first data network from the processor.

14. The method of claim 1, wherein the authentication is of a payment account.

15. The method of claim 14, further comprising updating the status of an account associated with a consumer to reflect the authentication of the payment account in the processor.

16. The method of claim 1, further comprising:
receiving an authentication failure transmitted over the second data network in the processor;
selecting a second set of available authentication options from the available account authentication options based on the database of attributes for the potential authentication options stored in the memory and not including the authentication option that produced the authentication failure in the processor;
transmitting the second selected set of available authentication options to the consumer over the first data network from the processor;
receiving a second selected authentication option transmitted over the first data network in the processor; and
transmitting consumer information to an authentication provider associated with the second selected authentication option over the second data network.

17. The method of claim 1, further comprising:
updating the database of attributes for the potential account authentication options in the memory to include the authentication confirmation in the processor.

18. The method of claim 17, wherein updating the database of attributes for the potential account authentication options comprises updating data for the authentication option selected to reflect at least one of the time of authentication, speed of authentication, cost of the authentication, consumer demographic information, device type, consumer location, or success rate.

19. The method of claim 1, further comprising:
receiving an authentication failure transmitted over the second data network in the processor; and
transmitting the consumer information to a second authentication provider associated with the selected authentication option over the second data network.

20. The method of claim 19, further comprising updating the database of attributes for the potential account authentication options in the memory to include the authentication failure in the processor.

21. The method of claim 16, further comprising updating the database of attributes for the potential account authentication options in the memory to include the authentication failure in the processor.

22. The method of claim 1, wherein one authentication option is selected from the available account authentication options based on the database of attributes for the potential authentication options stored in the memory in the processor.

23. The method of claim 22, further comprising:
transmitting a request for additional consumer information associated with the one selected authentication option to the consumer over the first data network from the processor; and
receiving additional consumer information transmitted over the first data network in the processor;
wherein the consumer information transmitted to the authentication provider comprises the additional consumer information.

24. The method of claim 1, wherein the database of attributes for the potential authentication options comprises information related to at least one of a successful completion rate, an average authentication time, or a cost.

25. The method of claim 1, wherein the authentication provider is selected based on
at least one of historical average authentication speed or instantaneous connection speed; and
at least one of preferred status or instantaneous availability.

26. The method of claim 1, wherein the authentication provider is selected based on at least historical average authentication speed.

27. A method for authentication comprising:
receiving consumer information associated with a consumer transmitted over a first data network in a processor;
determining available account authentication options based on the received consumer information and a database of potential authentication options stored in a memory in the processor;
selecting a set of available authentication options from the available account authentication options based on a database of attributes for the potential authentication options stored in the memory in the processor;
transmitting the selected set of available authentication options to the consumer over the first data network from the processor;
receiving a selected authentication option transmitted over the first data network in the processor;
selecting an authentication provider associated with the selected authentication option from a database stored in the memory of potential authentication providers capable of providing the selected authentication option in the processor, wherein the authentication provider is selected based on at least one of historical average authentication speed or instantaneous connection speed;
transmitting consumer information to the authentication provider associated with the selected authentication option over a second data network; and
receiving an authentication confirmation transmitted over the second data network in the processor,
wherein the database of attributes for the potential authentication options comprises information related to at least one of a successful completion rate, an average authentication time, or a cost.

28. The method of claim 27, wherein the authentication provider is selected based on
at least one of historical average authentication speed or instantaneous connection speed; and
at least one of preferred status or instantaneous availability.

29. The method of claim 27, wherein the authentication provider is selected based on at least historical average authentication speed.

30. The method of claim 27, wherein selecting the set of the available authentication options further comprises evaluating the real-time availability of an authentication provider associated with each authentication option.

31. The method of claim 27, wherein the selected set of the available authentication options transmitted to the consumer is a subset of the available account authentication options.

\* \* \* \* \*